United States Patent [19]

Fulmer

[11] Patent Number: 5,242,253
[45] Date of Patent: Sep. 7, 1993

[54] THREAD-FORMING SCREW

[75] Inventor: James G. Fulmer, Addison, Ill.

[73] Assignee: Semblex Corporation, Elmhurst, Ill.

[21] Appl. No.: 958,174

[22] Filed: Oct. 8, 1992

[51] Int. Cl.$^5$ .................. F16B 25/00; F16B 35/04
[52] U.S. Cl. ........................... 411/386; 411/416; 411/421
[58] Field of Search ............ 411/386, 387, 416, 418, 411/420, 421

[56] References Cited

U.S. PATENT DOCUMENTS

| 3,455,360 | 7/1969 | Simons . | |
|---|---|---|---|
| 3,800,585 | 4/1974 | Simons et al. | 72/469 |
| 3,818,749 | 6/1974 | Yankee et al. | 72/469 |
| 3,850,074 | 11/1974 | Simons . | |
| 3,868,871 | 3/1975 | Yankee et al. | 76/107 |
| 3,918,345 | 11/1975 | Phipard, Jr. | 411/416 |
| 3,934,444 | 1/1976 | Simons | 72/88 |
| 3,945,272 | 3/1976 | Simons | 76/107 |
| 4,040,328 | 8/1977 | Muenchinger | 411/416 X |

FOREIGN PATENT DOCUMENTS 46-1522  1/1971  Japan ........................... 411/416

*Primary Examiner*—Neill R. Wilson
*Attorney, Agent, or Firm*—Emrich & Dithmar

[57] ABSTRACT

A thread-forming screw includes a tapered end portion formed by inserting a cylindrical blank between paired dies each having a straight portion and a tapered portion. The threads of each die are provided with undulations along their lengths corresponding to the circumference of the screw blank so as to form a trilobular thread on the screw which spirals around its circumference from one end of the screw to the other in a direction opposite to that of the threads. The cylindrical blank provides increased material at the tapered thread-forming location for forming fully crested threads, while increasing the length of the tapered portion of the die and screw provides greater stress relief for reducing the force required for thread formation and allows the screw to be driven into a workpiece more easily while maintaining a high strip force. In a preferred embodiment, the tapered end of the screw has a constant minor diameter and two pitches in which the major diameter diminishes toward the end followed by two end pitches in which the major diameter remains constant.

1 Claim, 3 Drawing Sheets

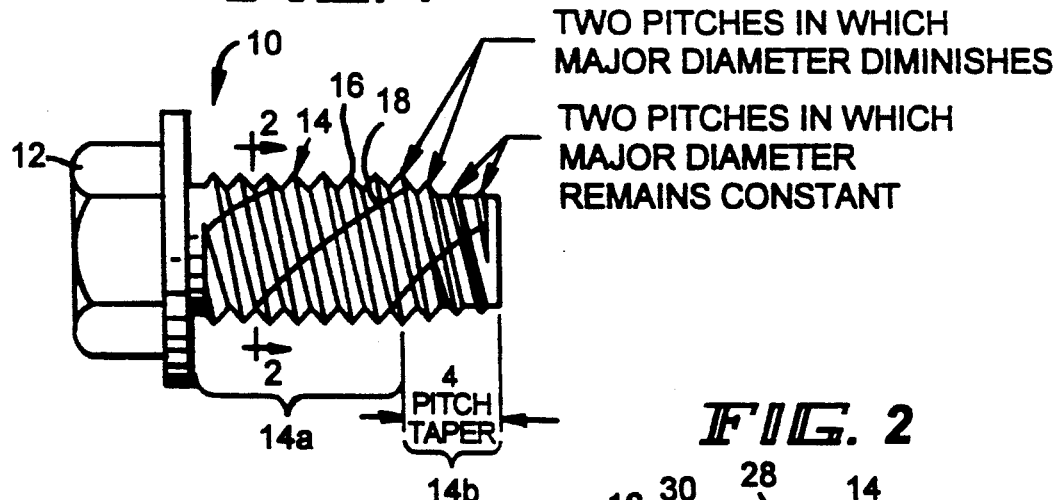
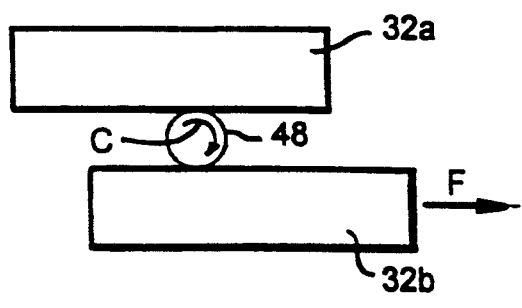
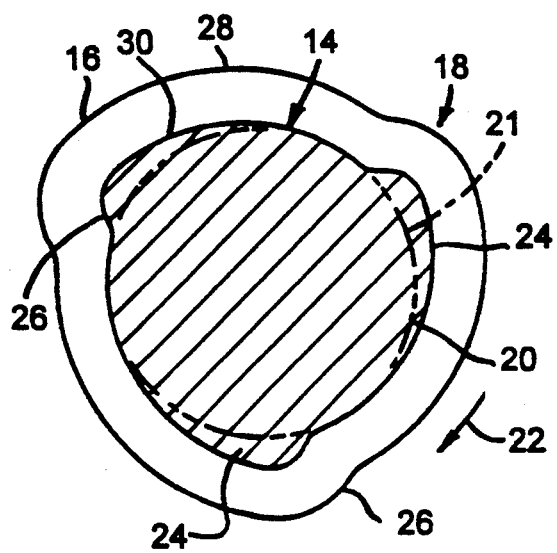
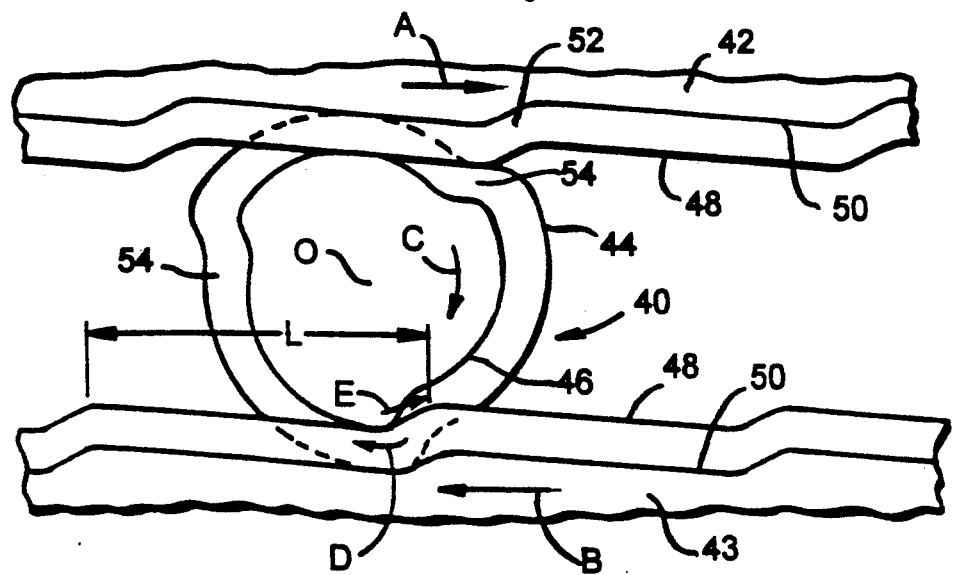

THREAD-FORMING SCREW

FIELD OF THE INVENTION

This invention relates generally to threaded fasteners and is particularly directed to a thread-forming screw with a tapered end and apparatus and method for the fabrication thereof.

BACKGROUND OF THE INVENTION

The use of thread-forming screws for securely coupling bodies is well known. This type of screw is inserted in an unthreaded bore or aperture and forms threads in the bore or aperture when a torque is applied. The screw structure is highly vibration-resistant for maintaining the coupling between the bodies even when subjected to considerable stress. Some self-threading screws include threads with multiple lobes around the circumference of the screw shank. The lobes, or undulations, further resist loosening of the screw.

Considerable torque is required in forming the threads on the screw's shank. The greater the required torque, the greater the required strength of the screw. The application of increased torque in the threading process as well as providing a screw comprised of materials of greater strength increase the cost of the end product. The goal is, therefore, to form the threads on the screw with a minimum torque. Where the screw is tapered, additional difficulty is encountered in providing the tapered portion with crested, or fully formed, threads. Threads which are not crested not only reduce the stripping torque required to remove the screw, but also render it more difficult to insert the screw. The size, shape and spacing of the threads on the tapered end of a thread-forming screw are critical to the ease with which it is inserted in an unthreaded bore or aperture because it is this portion of the screw which initiates the threading process.

The present invention affords the aforementioned advantages in a thread-forming screw which is formed from a cylindrical blank passed through a tapered thread rolling die so as to form fully crested tapered threads on its end with improved stress relief for facilitating the tapering and threading operation.

OBJECTS AND SUMMARY OF THE INVENTION

Accordingly, it is an object of the present invention to provide an improved thread-forming screw characterized by a low driving force/stripping force ratio.

It is another object of the present invention to provide a self-tapping screw for which the thread-forming operation and insertion in a workpiece is accomplished with minimal torque.

Yet another object of the present invention is to provide a thread-forming screw with an improved tapered, threaded point which facilitates insertion of the screw in an unthreaded body, or workpiece.

A further object of the present invention is to provide a thread-forming screw which can be manufactured inexpensively and relatively simply and may be of reduced strength because of the ease with which it is threaded and forms threads in a body.

A still further object of the present invention is to provide a thread-forming screw having fully crested, or sharply edged, threads along its entire length, including its tapered end portion.

Still another object is to maintain a thread-forming screw in alignment with a cylindrical hole in which it is inserted to facilitate the thread-forming driving of the screw into the hole.

These objects of the present invention are achieved and the disadvantages of the prior art are eliminated by a thread-forming screw comprising: an elongated shank having a continuous exterior thread and a plurality of exterior lobes distributed circumferentially about the shank in an equally spaced manner and extending spirally therealong in an angular direction opposite from the thread, the shank having in any plane normal to its axis an inner solid core portion of circular configuration and the lobes projecting outwardly beyond the core portion, the shank including a cylindrical threaded portion and a tapered threaded end portion, wherein the cylindrical and tapered threaded portions are formed from an unthreaded, untapered cylindrical blank for increased stress relief in forming fully crested threads and reduced torque required during thread-forming.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a side elevation view of a thread-forming screw in accordance with the principles of the present invention;

FIG. 2 is a sectional view of the thread-forming screw of FIG. 1 taken, along site line 2—2 therein;

FIG. 3 is a simplified schematic diagram illustrating the thread rolling operation in forming a thread-forming screw;

FIG. 4 is a simplified schematic diagram illustrating additional details of the thread and lobe forming operation by a pair of rolling dies for forming a thread-forming screw such as of the present invention;

DETAILED DESCRIPTION OF THE PREFERRED EMBODIMENTS

Figure 5:
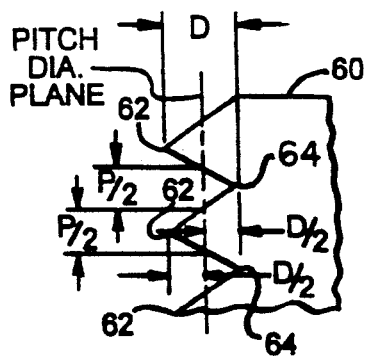
FIG. 5 is a fragmentary sectional view of a portion of a die used in forming a screw in accordance with the present invention.

Referring to FIG. 1, there is shown a side elevation view of a thread-forming screw 10 in accordance with the present invention. Screw 10 includes a head 12 and an elongated shank 14. The shank 14 has an exterior thread 16 as well as a plurality of spaced lobes 18, as more clearly shown in the sectional view of FIG. 2 taken along site line 2—2 in FIG. 1. Lobes 18 are circumferentially distributed about the axis of shank 14 and extend spirally therealong in an angular direction opposite from that of the thread 16 as shown in FIG. 1. The shank 14 of thread-forming screw 10 includes a straight, cylindrical portion 14a and a tapered, end portion 14b.

In any plane normal to it axis, shank 14 has an inner core portion 20 which is of circular configuration and concentric with its axis, and within the dot-dash line circle 21 shown in FIG. 2. Lobes 18 project from and are integral with the core portion 20, with the core portion comprising the central shank portion within the generated circle 21 coaxial with the shank axis.

When the screw is turned into a body, the screw is rotated in the direction of arrow 22 in FIG. 2. Each lobe 18 has an elongated leading leg 24 which progresses gradually away from the axis of the shank in the direction of turning 22. Each lobe 18 also has a trailing leg 26 which abruptly turns inwardly toward the shank axis and which is much shorter than the leading leg 24. The lobes 18 are therefore non-symmetrical. Each elongated leading leg 24 is convexly curved and merges smoothly into the trailing leg 26 which is concave only at its innermost region where it adjoins the circular core portion 20 and the leading leg of the next lobe, as shown in FIG. 2. The progression of each leading leg 24 away from the axis of the shank is continuous from the beginning of the leading leg up to its merger with the abruptly returning trailing leg 26. In addition, the thread 16 has between its crest 28 and its root 30 a uniform radial width. Thus, the configuration of lobes 18 and crests 28 of the thread 16 matches the configuration of the lobes along the thread root 30.

In a preferred embodiment, three lobes 18 are uniformly distributed about the shank axis, with each lobe extending over an arc of approximately 120° as shown in FIG. 2. Thread-forming screw 10 is formed by means of a thread roll-die, since the lobes are spiral, with the same pressure applied along the entire length of the screw so that slippage in thread rolling is minimized. In addition, roundness of the finished screw is maintained since there is no interruption in the rolling of the lobes, as would be the case if the lobes simply extended axially. Thus, a single rolling operation may be used to form the threads and lobes in the shank 14 of the thread-forming screw 10.

Each lobe 18 in the thread-forming screw 10 gradually, yet continuously, rises to its maximum distance from the shank axis and then abruptly drops back in toward the axis, before the gradual rise which forms the next lobe. Each lobe thus progresses gradually away from the shank axis in the direction in which the screw is turned into a body. When the screw is backed out of the threaded bore, the abrupt heel formed by the shorter trailing leg 26 of each lobe 18 offers resistance to unscrewing, since the metal of the mating threaded part tends to close in behind the trailing leg of each lobe during formation of the thread. Because the threads thus rise and fall according to the conformation of the lobes 18, it is possible to achieve the thread-forming operations in a much easier manner since a lower torque is required than would be the case with the use of, for example, three lobes each of which is of a symmetrical construction such as encountered in other thread-forming screws.

The particular trilobular construction of the thread-forming screw 10 of the present invention allows the screw to form a thread. The thread-forming operation is greatly facilitated by the particular construction of the lobes referred to above. Inasmuch as the lobes are disposed about the shank axis in a spiral, formation of the thread in a body into which the screw 10 is turned is performed smoothly and without any interruption, thus further facilitating the thread-forming operation. Accordingly, the thread-forming screw 10 is especially suitable as a tapping device and the term "thread-forming screw" is intended to encompass such tapping devices having the characteristic lobular construction described above.

Screws of the type described thus far perform well in standard "pull-out" tests. This improved performance is due to the spirally situated lobes and the high point of each lobe located at the exterior of the screw around the entire 360° of the shank such that a pull-out will engage 360° of the mating member. Thus, much more force is required to pull-out a thread-forming screw 10 in accordance with the present invention than any other type of lobular screw in which the lobes are distributed axially along the shank. After the thread-forming screw 10 has been used to form the thread in a hole of a body into which the screw is turned, since the lobes 18 are situated so as to "wipe" in a thread and simultaneously form spirally a thread which is tapped in smoothly around 360° of the shank, a particularly low torque results.

Referring to FIG. 3, there is shown in simplified schematic diagram form an arrangement for forming the threads and lobes in a shank 48. In operation, two dies 32a and 32b are positioned with their working faces parallel to each other and spaced apart by an amount sufficient to accommodate the shank 48 of a blank to be formed into a thread-forming screw. While upper die 32a remains stationary, lower die 32b is displaced in the plane of their working surfaces, as indicated by the direction of arrow F in FIG. 3, so that the shank 48 is rotated clockwise, as indicated by the arrow C. During the initial portion of the thread rolling operation, the nonundulated portions of the grooves and ridges in the dies 32a and 32b form threads about the shank 48 in a conventional manner. Thereafter, however, undulations in the dies 32a, 32b which are described below engage the shank 48 to form the lobes in the screw threads.

Referring to FIG. 4, there is shown in stylized form in cross section additional details of the rolling of a trilobular threaded blank 40 between two threaded dies 42 and 43. It should be emphasized that FIG. 4 is stylized and does not accurately represent actual thread-forming conditions. Threaded blank 40 includes a thread crest 44 and a thread root 46, both represented in solid-line form. Similarly, dies 42 and 43 include thread-forming ridges 48 and grooves 50, also represented in solid-line form. In a true cross sectional view, the thread grooves 46 of blank 40 and the grooves of dies 42 and 43 would be shown in dotted-line form. Also in an actual cross sectional view, the thread on blank 40 would spiral down and become overlapped on itself at some point and the lobes would also experience a similar condition since they also undergo spiraling. These discrepancies have been introduced to simplify the drawing and aid in visualizing the rolling action of the blank 40 between dies 42 and 43.

As described above with respect to FIG. 3, during rolling of the blank 40, the upper die 42 moves rightward as indicated by the direction of arrow A, while the lower die 43 remains stationary. This, of course, corresponds to relative leftward movement of the lower die 43 with respect to the upper die 42, as indicated by the direction of arrow B in the figure. This relative die movement causes the blank 40 to roll clockwise in the direction of arrow C about an axis 0. During this rolling the blank thread crest 44 contacts the die grooves 50 and the blank thread root 46 contacts the die ridges 48. Dies 42 and 43 remain a fixed distance apart and the axis 0 of blank 40 remains centered therebetween. The rolling of the blank thread on either die therefore resembles the rolling of a flanged wheel on a track. If the point of roll against the lower die 43 is at the point of contact between the blank thread root 46 and the corresponding die ridge 48, then the thread crest 44 must slip backwardly relative to the corresponding die groove 50 as indicated by the direction of arrow D. On the other hand, if the point of roll is at the thread crest 44 of the blank (and at the bottom of the disc groove 50) then the thread root 46 is forced to slip forward as indicated by the arrow E. A similar action occurs where the blank 40 engages the upper die 42. For any point of rolling between the crest and root, similar slippages will occur at both the crest and root. Because of these slippages, a given distance along a die in any plane other than that in which the actual rolling takes place does not correspond to the same distance along the thread being rolled. While this does not have any appreciable effect in the formation of a continuous thread, it does have an effect where irregularities, i.e., lobes, are to be formed in the disc. In the present case, where the die formations have pressings, which are described in detail below, the spacing L between successive pressings will not register with corresponding lobe formations 54 on the blank during rolling unless the distance is the same as the circumferential distance about the blank 40 measured at the plane of actual roll. Thus, the distance between successive lobe forming pressings along a die is equal to the circumferential distance between successive lobes to be formed on the screw measured along a cylindrical plane having a diameter approximately half way between the pitch diameter and the pressed, or major, diameter of the screw.

Figure 6:
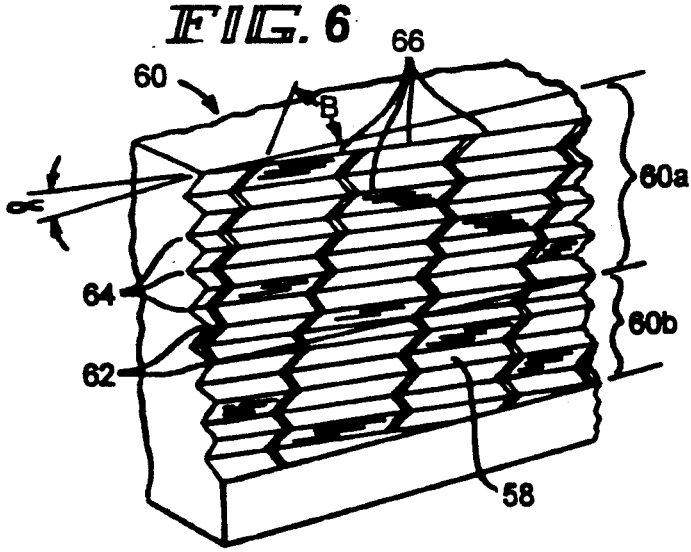
FIG. 6 is a fragmentary perspective view showing the thread-forming and lobe-forming portions of a die used in forming a screw in accordance with the present invention.
Figure 7:
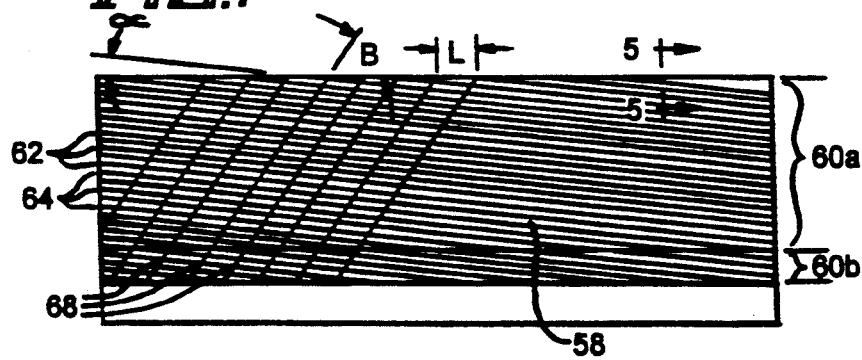
FIG. 7 is an elevational view of the screw forming die of FIG. 6.

Referring to FIGS. 6 and 7, there are respectively shown a partial perspective view and an elevation view of a die 60 used in forming a thread-forming screw in accordance with the principles of the present invention. FIG. 5 is an enlarged partial sectional view of an upper portion of die 60 as illustrated in FIG. 7 taken along site line 5—5 therein. A thread-forming surface 58 of die 60 has ridges 62 and grooves 64 which extend continuously toward the right, or entrance end of the die. Toward the left or finishing end of the die, however, the ridges 62 and grooves 64 making up the thread-forming surface 58 are interrupted or undulated with respect to the plane of the die working surface. These undulations are arranged in slanted columns as indicated by interruption lines 68. It will be noted that the columns extend at a column angle $\beta$ with respect to the upper and lower surfaces of the die and with respect to the path of die movement. This angle $\beta$ is the same as the helix angle of the lobe spiral shown by the lines 18 in FIG. I. It should also be noted that the ridges 62 and grooves 64 extend at a helix angle $\alpha$ with respect to the upper and lower die surfaces and the path of die movement. This angle $\alpha$, which is in a direction opposite to that of the angle $\beta$, is the same as the helix angle of the thread 16 in FIG. 1.

With reference to FIG. 6, it will be seen that the undulations in the thread-forming surface 58 of die 60 are actually a series of "pressings" 66 whereby the ridges 62 and grooves 64 are actually tilted or slanted slightly with respect to the plane of the thread-forming surface without appreciable change in cross section, contour or helix angle $\alpha$. The depth of the pressings 66, i.e., the distance from the highest to the lowest point on a ridge 62 or on a groove 64 of each pressing measured in a direction perpendicular to the plane of the thread-forming surface 58, may vary according to the thread size. It should also be noted that each pressing 66 is asymmetrical, i.e., it rises gradually outwardly with respect to the plane of the thread-forming surface 58 over most of its length in a leftward direction and then returns rather abruptly back inwardly with respect to the working surface plane. This configuration produces an asymmetrically lobed thread as described above with respect to FIGS. 2 and 4. It will also be understood that the die arranged in spaced relation to die 60 has thread-forming ridges and grooves and lobe forming undulations or pressings identical in size and shape to those of die 60, but reversed as to column and helix angle $\beta$ and $\alpha$ so as to complement die 60.

As shown in FIG. 5, the pitch P is the distance between two corresponding points on adjacent screw threads or the distance traveled by a screw in a single revolution. The distance P/2 is one-half the pitch or the distance between adjacent ridges 62 or adjacent grooves 64. The pitch diameter plane is a plane passing midway between the parallel arrays of ridges 62 and grooves 64, while the pitch diameter D is the distance between the aligned ridges and grooves in a direction transverse to the pitch diameter plane.

In accordance with the principals of the present invention, the thread-forming surface 58 of die 60 includes a straight portion 60a and a tapered portion 60b. The tapered portion in a preferred embodiment includes the four lowest pitches, or thread forming ridges 62 and grooves 64 combinations.

Figure 8:
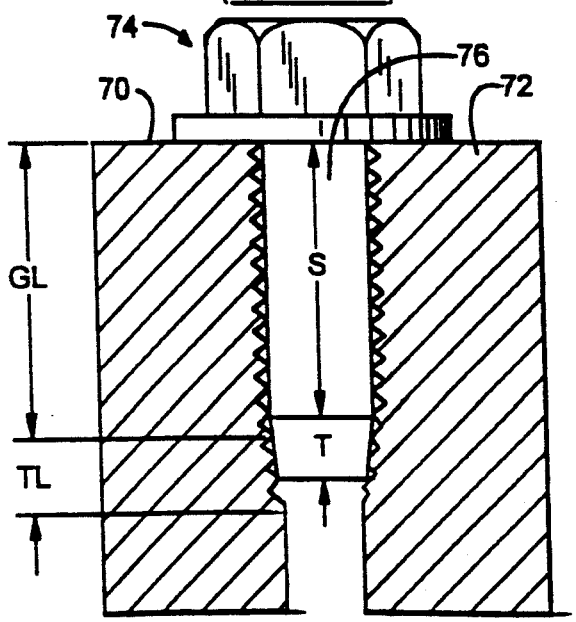
FIGS. 8 and 9 are simplified sectional views respectively illustrating a prior art screw and a screw fabricated in accordance with the present invention in position between thread-forming dies prior to initiation of the thread-forming operation.

Referring to FIG. 8, there is shown a sectional view of a prior art arrangement for forming threads in a thread-forming screw 74 having a shank 76. A pair of dies 70 and 72 having facing surfaces with alternating ridges and grooves and pressings as previously described are positioned for tight-fitting engagement with the shank 76 of blank 74. Shank 76 includes a cylindrical, straight portion having a length S and a tapered end portion having a length T. Similarly, the thread-forming facing surfaces of the first and second dies 70, 72 include straight upper portions having alternating ridges and grooves and a length GL. Portions of the first and second dies 70, 72 adjacent to the ridged and grooved straight facing surfaces thereof are provided with a taper having a length TL and including three pitches. It should be noted here that FIGS. 8 and 9 illustrate the thread-forming dies and the screw blank in position prior to formation of the threads.

Figure 9:
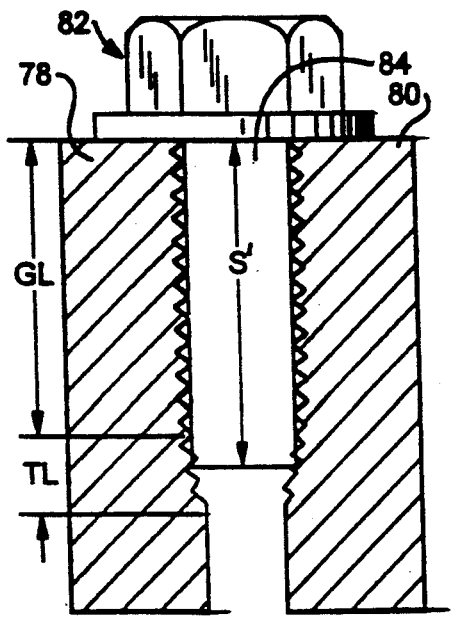

In the inventive thread-forming arrangement of FIG. 9, the first and second dies 78 and 80 similarly include straight ridged and grooved portions each having a length GL. Immediately below the facing straight portions of the first and second dies 78, 80 are respective tapered portions each having a length TL. In forming threads in accordance with the present invention, the shank 84 of blank 82 is straight and cylindrical having a length S' and does not include a tapered end portion. In a preferred embodiment, the lower tapered facing surfaces of the first and second dies 78, 80 includes four pitches. It Should be noted here that S+T>S'. In addition, in the prior art approach of FIG. 8 the full body (untapered portion) of shank 76 does not extend into the tapered (or rise) portions of the dies 70 and 72. On the other hand, in the inventive thread-forming approach of FIG. 9, the cylindrical shank 84 of blank 82 extends into the tapered portions of dies 78 and 80.

Figure 10:
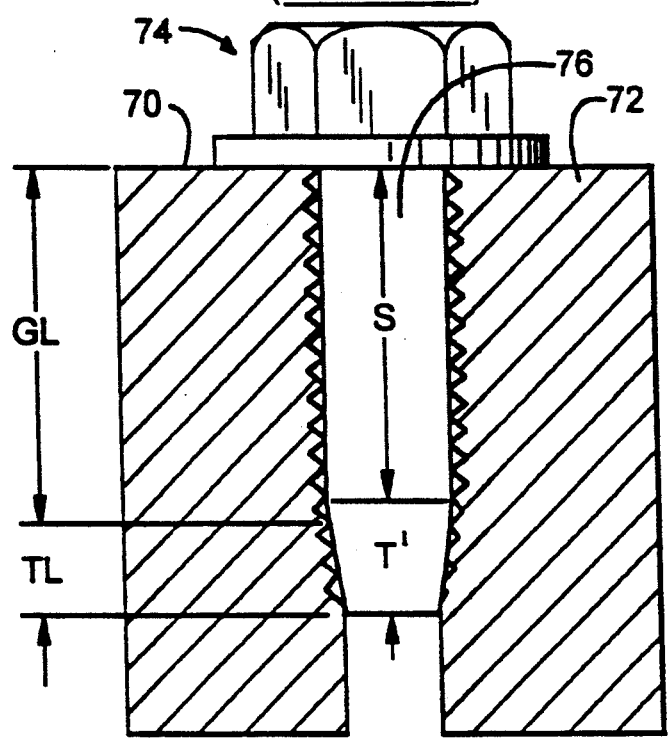
FIGS. 10 and 11 are simplified sectional views respectively illustrating a prior art screw and a screw formed in accordance with the present invention shown in position between a pair of dies forming threads in a screw blank.
Figure 11:
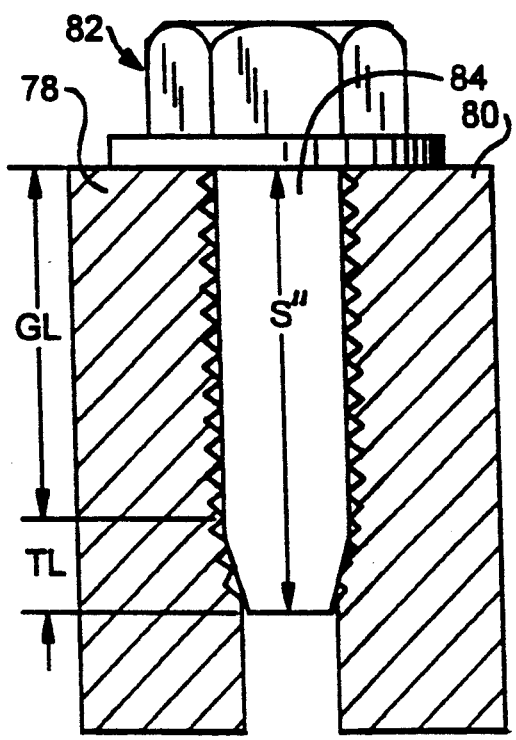

Referring to FIGS. 10 and 11, there are respectively shown blanks 74 and 82 following the thread-forming operation. From FIG. 10, it can be seen that the tapered end of the shank 76 of the prior art blank 74 has been extended downwardly and has an increase length T'. The extended tapered end portion of the shank 76 of the prior art blank 74 extends over three pitches, with the shank length (S+T') equal to the sum of straight and tapered lengths GL and TL of the thread-forming dies 70 and 76.

In the inventive approach of FIG. 11, the shank 84 of the blank 82 has similarly been elongated to a length S" during the thread forming operation. Moreover, the end portion of shank 84 has been tapered by means of the four tapered pitches in the facing thread-forming surfaces of the first and second dies 78 and 80. In a preferred embodiment, the end portion of the shank 84 of blank 82 is provided with four pitches of thread in which a minor diameter on the end of the shank 84 remains constant, with two pitches in which the major diameter diminishes toward the end followed by two end pitches in which the major diameter remains constant. The two end pitches of the same diameter maintain the screw in alignment with a cylindrical aperture, or hole, in which it is inserted and ensure that the screw is driven straight into the aperture.

There has thus been shown an improved thread-forming screw and method of manufacture therefore. The method includes inserting an untapered, cylindrical shank of a screw blank between facing thread-forming surfaces of a pair of rolling dies. The facing surfaces of the rolling dies are provided with a plurality of spaced pressings wherein the ridges and grooves in the thread-forming surfaces are tilted, or slanted, slightly with respect to the plane of the forming surface without appreciable change in cross section, contour or helix angle. The pressings form a plurality of spaced lobes about the threads in the shank, where the pressings are in a direction opposite to that of the thread-forming alternating ridges and grooves in the thread-forming surfaces of the dies. Facing tapered portions in the dies form the end of the cylindrical blank in a threaded, tapered configuration such that the tapered threads on the end of the blank include four pitches of thread in which the minor diameter remains constant, while the major diameter diminishes, but remains sharp for two pitches and remains constant at a reduced diameter for the last two pitches. The last two pitches of reduced, fixed diameter maintain the screw aligned with the aperture in which it is inserted for facilitating driving the screw into the aperture. The cylindrical end portion of the unthreaded blank provides increased material at the tapered thread-forming location for forming fully crested threads, while increasing the length of the tapered portion of the die and screw to four pitches increases stress relief in the blank thus reducing the force required for thread-forming and allows the screw to be driven into a workpiece more easily while maintaining a high strip force.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A thread-forming screw comprising: an elongated shank having a continuous exterior thread and a plurality of exterior lobes distributed circumferentially about said shank in an equally spaced manner and extending spirally therealong in an angular direction opposite from said thread, said shank having in any plane normal to its axis an inner solid core portion of circular configuration and said lobes projecting outwardly beyond said core portion, said shank including a cylindrical threaded portion and an increased stress relief, tapered threaded end portion, wherein said cylindrical and tapered threaded portions are formed from an unthreaded, untapered cylindrical blank for increased stress relief in forming fully crested threads with the application of reduced torque, wherein said tapered end potion has a constant minor diameter and includes four pitches, with two pitches having a diminishing major diameter toward the end and two end pitches having a constant major diameter for maintaining the screw in alignment with an aperture in which the screw is inserted to facilitate driving the screw into said aperture.

* * * * *